E. LUEBECK.
ROTARY ENGINE.
APPLICATION FILED JUNE 10, 1918.

1,363,256.

Patented Dec. 28, 1920.

Inventor
Elmer Luebeck

E. LUEBECK.
ROTARY ENGINE.
APPLICATION FILED JUNE 10, 1918.

1,363,256.

Patented Dec. 28, 1920.

Inventor
Elmer Luebeck
By William W. Hall
Atty.

E. LUEBECK.
ROTARY ENGINE.
APPLICATION FILED JUNE 10, 1918.

1,363,256.

Patented Dec. 28, 1920.
7 SHEETS—SHEET 4.

Inventor
Elmer Luebeck
By: William L. Pace
Atty.

UNITED STATES PATENT OFFICE.

ELMER LUEBECK, OF CHICAGO, ILLINOIS.

ROTARY ENGINE.

1,363,256.     Specification of Letters Patent.     Patented Dec. 28, 1920.

Application filed June 10, 1918. Serial No. 239,167.

*To all whom it may concern:*

Be it known that I, ELMER LUEBECK, a citizen of the United States, and a resident of Chicago, in the county of Cook and State of Illinois, have invented certain new and useful Improvements in Rotary Engines; and I do hereby declare that the following is a full, clear, and exact description thereof, reference being had to the accompanying drawings, and to the characters of reference marked thereon, which form a part of this specification.

This invention relates to a novel rotary engine and is herein shown and adapted to an explosion engine, although the principles of the construction may be embodied in a steam or air engine. When adapted as an explosion engine it conveniently takes the form of a two cycle engine wherein an explosion occurs at each rotation of the rotor.

Among the objects of the invention is to provide an engine of this character in which the spent motive agent is effectually exhausted from the engine after each power impulse of the rotor.

A further object of the invention is to provide a construction wherein the voluminal capacity of the cylinder may be varied so as to vary the horse power of the engine without increasing its speed of rotation, and in respect of this latter feature a further object of the invention resides in means for varying the voluminal capacity of the cylinder when the engien is in motion so as. at will, to thereby increase the power delivered by the engine in accordance with the demand thereon.

Another object of the invention is to provide a novel construction in rotary engines wherein the piston carried by the rotor and the abutment carried by the stator, and which normally extend transversely across the cylinder, may be relatively withdrawn from each other so as to pass during each rotation of the rotor.

Other objects of the invention are to provide a novel valve mechanism for controlling the supply of motive agent to and the exhaust of the spent motive agent from the cylinder.

The invention consists in the combination and arrangement of the parts shown in the drawings and described in the specification, and is pointed out in the appended claims. The invention as herein shown is embodied in an explosion engine, and in the following description will be so specifically applied, without limitation, however, as to the motive agent.

In said drawings.

As shown in the drawings, 15 designates the stator. It comprises a centrally depressed end member or web 16 and inner and outer radial flanges 17, 17, between which is formed an annular cylinder 18. Said cylinder is open at the end of the stator remote from the web 16. 20 designates the rotor which comprises a web 21 and an annular rim or flange 22 which is made of a width to closely fit within the cylinder 18. Said rotor is keyed to and rotates with a power shaft 24 and said power shaft is mounted at its ends in standards or pillow blocks 25, 26 that rise from and are fixed to the base 27 of the engine frame.

The stator is axially movable toward and from the rotor, and is supported for such movement upon fixed shafts or rods 28, 28, said stator being provided with apertured lugs 29, 29 through which the said shafts extend. Said shafts 28 are supported at their ends on lugs 30 which are fixed to end plates 31 of the engine frame. The purpose of moving the stator toward and from the rotor is to drive the spent gases from the cylinder when the stator is moved toward the rotor and to provide the desired cylinder volume when the stator is moved away from the rotor; these movements of the stator occurring once during each rotation of the rotor. Furthermore, the arrangement whereby the stator is movable toward and from the rotor permits the stator to be adjusted and locked in adjustment to increase or decrease the voluminal capacity of the cylinder, to thereby vary the horse power of the engine, as will hereinafter more fully appear.

32 designates what is hereinafter termed a piston that is associated with the rotor. It comprises a solid block, and has parallel end faces and arc shaped side faces, the latter to conform to the walls of the cylinder. The edge walls of said piston are disposed in planes radial to the axis of the rotor. Said piston is slidably seated in a notched portion or pocket 33 of the rim or flange 22 of the rotor so as to be movable in a plane parallel to the plane of the axis of the rotor and to be projected across the cylinder 18 when the stator is retracted from the rotor, with its end face engaged with one end wall 34 of the cylinder.

38 designates what is hereinafter termed an abutment block. It is made of the same cross sectional contour as the piston 32 and is likewise adapted to extend across the cylinder when the stator is retracted from the rotor and to constantly bear against the end face of the rim or flange 22 of the rotor. The pressure of the ignited motive agent is exerted between the abutment block and piston and, by reason of the non-rotation of the stator which carries the abutment block, and of the rotation of the rotor which carries the piston, the piston is driven away from the abutment in a circular path. Suitable inlet and exhaust valve mechanisms, hereinafter to be described, are provided for controlling the supply of the motive agent to, and its exhaust from, the cylinder.

Figure 9:
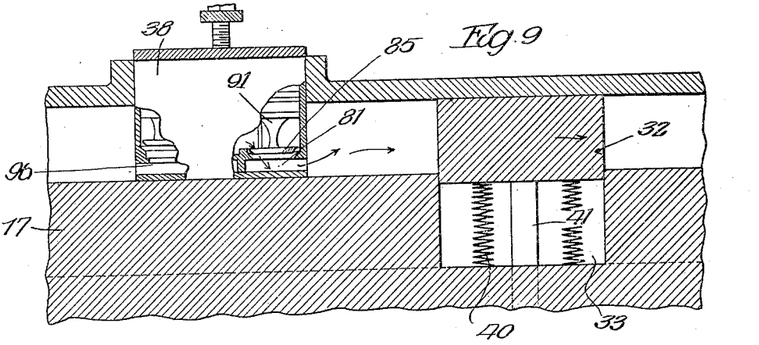
Figs. 9, 10, and 11 are diagrammatic views showing different stages of the operation of the engine.
Figure 10:
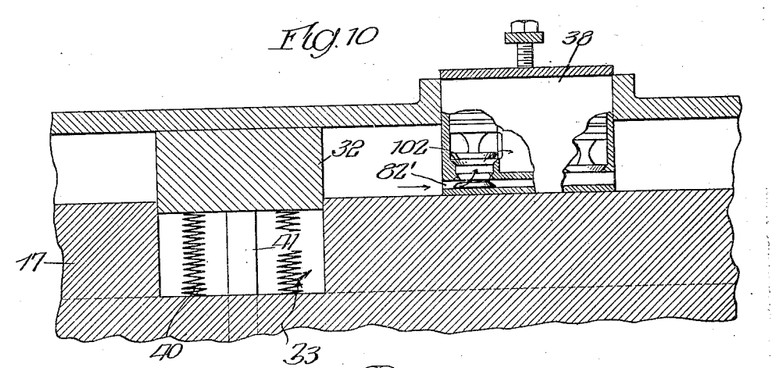
Figure 11:
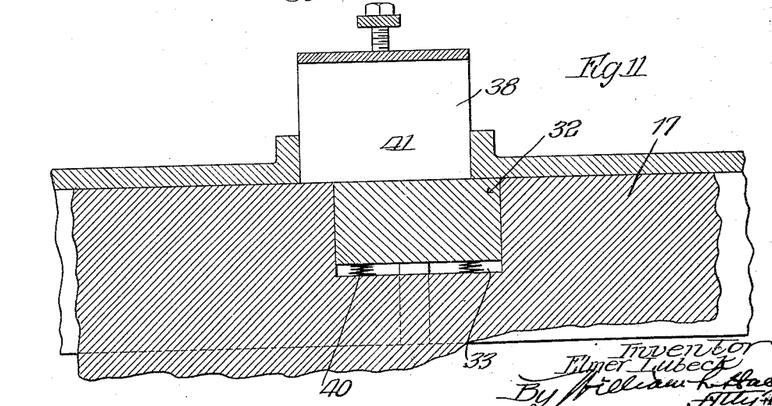

The relative positions of the abutment block and piston at the beginning of the power cycle of the engine is shown diagrammatically in Fig. 9, and their relative positions near the end of said power stroke is indicated in Fig. 10. The positions of the piston and abutment block, when the piston passes the block, is shown in Fig. 11. The piston 32 is projected toward the bottom wall of the cylinder by spiral expansion springs 40 and guided by a rod 41, which are interposed between said piston and the bottom of the pocket 33, which receives said piston, the bottom wall of said pocket and said piston being recessed to partially receive the ends of said spiral springs and the guide rod.

Figure 1:
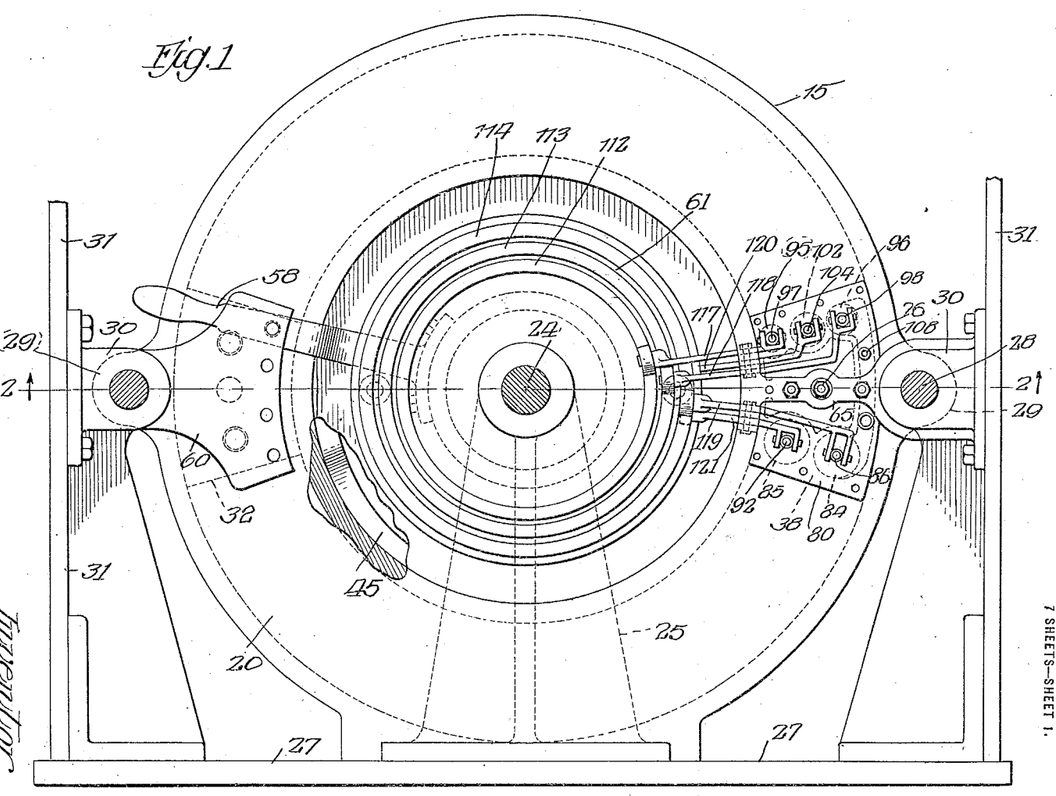
Figure 1 is a rear elevation, with parts in section, of an engine embodying my invention.
Figure 2:
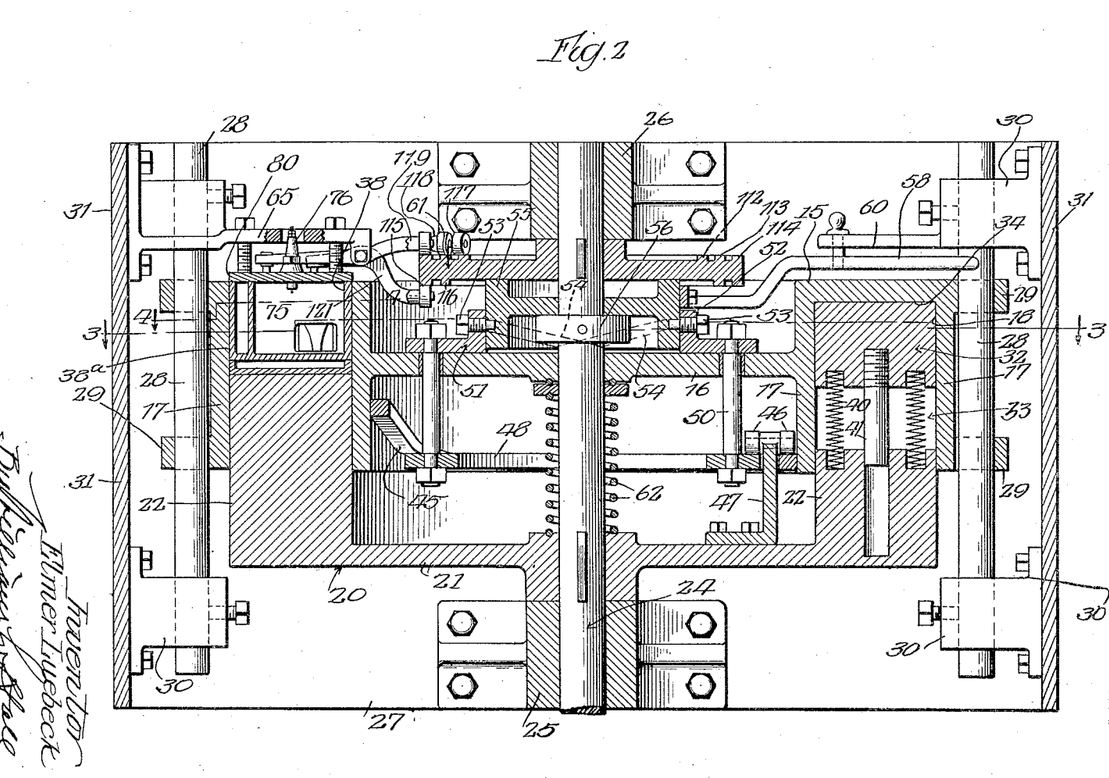
Fig. 2 is a horizontal section on the line 2—2 of Fig. 1.

Assuming the valve mechanisms to be designed and operated to control the supply of an explosive mixture to and the spent gases from an explosion engine, the burning mixture is admitted to the space between the abutment block and piston in the position which the parts occupy as shown in Fig. 9, and the explosion of the burning mixture drives the piston in a circular path to the position shown in Fig. 10, the abutment remaining stationary. At or about the latter positions of the piston and abutment block, the stator is caused to be moved axially toward the rotor, by means to be hereinafter described, for the double purpose of expelling the spent gases from the cylinder and to allow the piston to pass the abutment block. Inasmuch as the stator only is axially displaceable, it will be seen from an inspection of Fig. 11 that axial movement of the stator forces the piston into the pocket 33 of the rotor, and said pocket is of such depth that the piston is moved wholly within said pocket, with its end face flush with the end face of the rim or flange 22 of the rotor. By reason of the fact that the rotor is axially fixed and the face of the flange 22 bears against said abutment block, said block remains fixed in space while the axial movement of the stator causes the block relatively to recede into the pocket 38ᵃ of the stator until the end face of the abutment block is flush with the end or bottom wall of the cylinder 18. Fig. 11 illustrates the position of the parts when the endwise displaceable stator is at the limit of its movement toward the rotor; and it will be noted, from an inspection thereof, that the end faces of the piston and the abutment block are flush with the respective faces of the cylinder walls formed on the stator and rotor, so that said parts, normally projected across the cylinder and, therefore, in clashing paths, are free to pass each other. The means herein shown for giving axial movement to the stator are made as follows:

45 designates a cam ring that is located within a hollow portion of the stator that overlaps the rotor and the ring is attached thereto. Said cam ring is concentric to the axis of the shaft 24 and its cam portion is deflected in a direction parallel to said axis. 46, 46 designate rollers, one of which travels on said cam ring. They are mounted on a shaft that is carried by a bracket 47 which is attached to the web 21 of the rotor 20. 48 designates a circular, uncammed ring that is concentric to the axis of said shaft 24 and lies in the plane of the major portion of the cam ring 45. Said ring 48 is fixed to the web 16 of the stator by bolts 50 that are shouldered to engage and extend through the ring 48; and the ring is radially spaced from the cam ring to provide an annular space to receive the bracket 47, whereby one of the rollers 46 may travel on that portion of the ring 48 that is in the plane of the plain portion of the cam ring, as shown in Fig. 2. Said bolts 50 extend freely through openings in the web 16, preferably equipped with bushings, and are shouldered to extend through and engage a flanged ring 51 that lies against the outer face of the web 16. The flange 52 of the ring 51 is pierced to receive threaded studs 53, the ends of which extend into cam slots 54 of a cam 55 that is slidably fitted on the shaft 24 and bears against a collar 56 that is pinned or otherwise fixedly secured to said shaft. This cam 55 is adapted to be angularly adjusted about the axis of the shaft 24, as by means of a lever 58, so as to vary the extent of the axial displacing movement of the stator 15, and thereby the voluminal capacity of the cylinder. The lever 58 may be locked in adjusted positions to a segment 60 that is fixed to an adjacent lug 30 of the engine frame, the detachable locking means being of any suitable character. The said cam 55 is held axially fixed on the shaft 24 by contact with a cam disk 61 that is backed by the adjacent pillow block 26. A spiral expansion spring 62 surrounding said shaft 24 and interposed between the webs of the stator and rotor normally forces the stator at its farthest spaced position from the rotor and against the limiting ring 51.

With the construction described, it will be observed that the travel of the outer roller 46 on the deflected portion of the cam ring effects the forcing of the stator toward the rotor until they are caused to meet at their opposing flat faces, as shown in Fig. 11, and as the roller 46 passes off the deflected to the plain portion of the ring 45, the spring 62 restores the parts to normal position. When the parts assume the position shown in Fig. 11, the piston 32 has been forced into its notch 33 in the rotor flange, while the abutment block has remained axially fixed in space, due to its connecting bracket 65, while the stator has been axially displaced with respect thereto toward the rotor. Thus the double function is effected of permitting the piston to pass the abutment block of and also of forcing the spent gases from the cylinder through an exhaust port, which latter is timely opened for this purpose.

As herein shown, the inlet and exhaust valve mechanisms are carried by the abutment block 38. The said abutment block is also formed to provide a combustion chamber 75 Fig. 6 equipped with a spark plug 76 in which chamber the compressed mixture charge is fired, the combustion chamber being in communication at appropriate times with the cylinder at one side of said block to deliver the burning mixture against the power face of the piston, and also with the cylinder at the other side of said block to permit the compressed mixture which is compressed between the forward face of the piston and the abutment block to enter the combustion chamber prior to the firing period. As herein shown, these parts are made as follows:

The said valves of the abutment block 70 are arranged in two sets, there being two valves in one set at what may be termed the front side of the block, and three valves in the other set at the rear side of the block. These valves have the form of cone valves, 75 as shown, to engage tapered seats.

Figure 6:
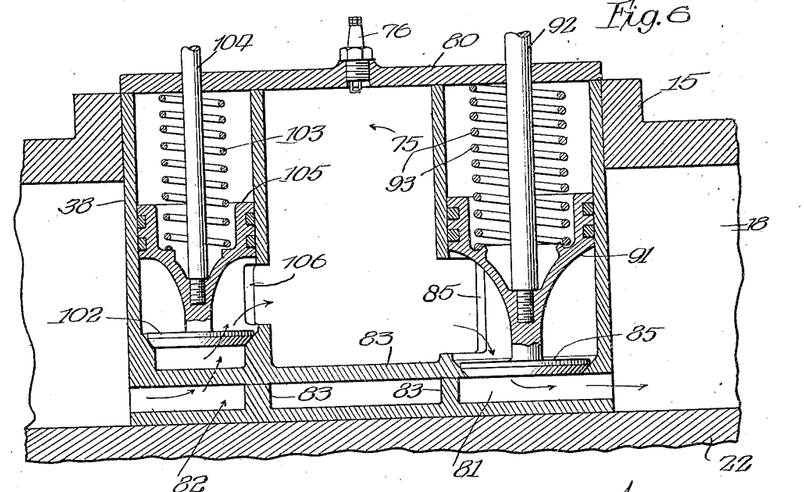
Fig. 6 is a section on the indirect line 6—6 of Fig. 4.

The abutment block is made principally of a hollow casting which embraces as a major portion thereof the combustion chamber 75. It is covered with a removable cover 80 plate 80. Said block embraces at its lower side two chambers 81, 82 (Fig. 6), the former of which is directed forwardly into that portion of the cylinder space between the abutment block and the piston and 85 which receives the power impulse of the fired mixture charge, and the latter of which opens rearwardly into that portion of the cylinder space between the abutment block and the piston, when the piston is at the 90 end of its forward stroke at which the mixture is compressed. These chambers 81, 82 are separated by transverse partitions 83 (Figs. 4 and 6).

Figure 4:
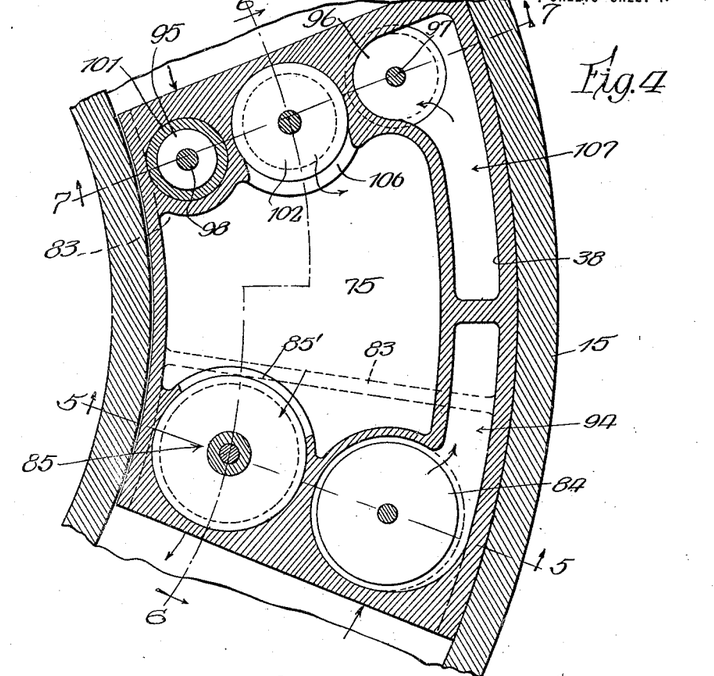
Fig. 4 is a detail section on the line 4—4 of Fig. 2.
Figure 5:
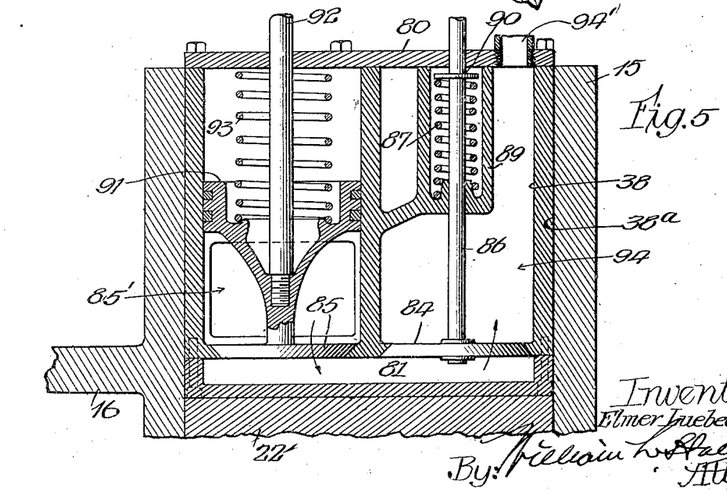
Fig. 5 is a section on the line 5—5 of Fig. 4.

That portion of the casting constituting 95 the top wall of the chamber 81 (Figs. 5 and 6) is pierced to provide two valve thoroughfares surrounded by tapered seats which are controlled by conical valves 84, 85 (Fig. 4). The stem 86 of the valve 84 extends through 100 a guide opening in the top wall 80 of the casing and is urged upwardly toward its seat by a spring 87 that is interposed between the bottom of an inclosure 89 and a collar 90 on the valve stem. The valve 85 105 is connected to or formed integral with a piston-like guide 91 to which is connected a stem 92 that slides through a guide opening in the cover plate 80; and said valve 85 closes downwardly against its seat through 110 a spiral expansion spring 93 disposed between said cover plate and a shoulder on the piston guide. The passage controlled by the valve 84 communicates with an exhaust passage 94 within the abutment block, said 115 passage communicating through an opening to an exhaust pipe. The passage which is controlled by the valve 85 communicates through a port 85' with the combustion or firing chamber 75. 120

Therefore, when the valve 84 is opened the exhaust or spent gases are free to pass from the cylinder through the passage 94 to the exhaust pipe of the engine. When, likewise, the valve 85 is opened at a proper time in 125 respect of the period of ignition of the explosion mixture in the combustion chamber 75, the resultant flame is free to pass through the port 85', the passage controlled by the valve 85 and the passage 81, into the 130 cylinder in rear of the piston to drive the piston forwardly in its circular path. The valve 85 is thus operated to transfer the explosion flame to the cylinder at the time when the general engine parts occupy the position shown in Fig. 9. When the valve 84 is open and free thoroughfare is afforded through the passage 81, the valve opening controlled by the valve 84 and the passage 94 to the exhaust pipe, the valve 85 is closed. Said valve 84 is thus opened at or about the time the main engine parts reach the position shown in Fig. 10 of the drawings and between this period and the period when said parts reach the position shown in Fig. 11. In other words, the exhaust valve is opened when the stator is forced toward and against the rotor.

Figure 7:
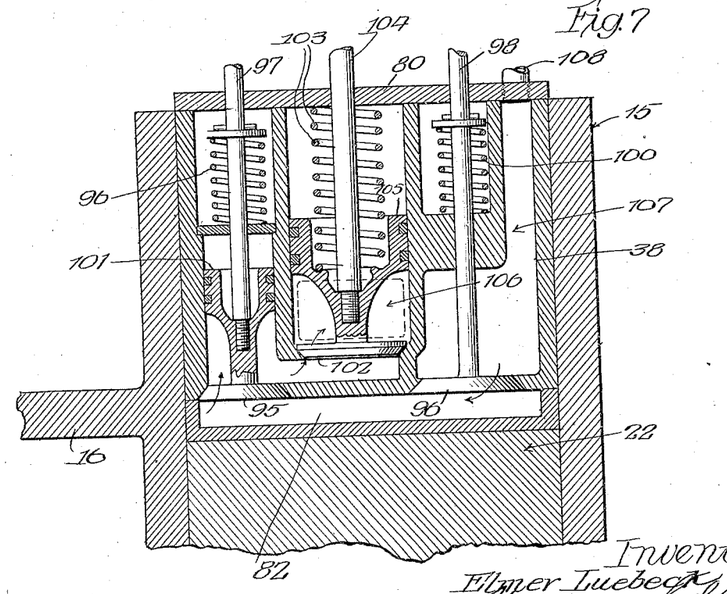
Fig. 7 is a section on the line 7—7 of Fig. 4.

The top wall of the passage 82 is pierced to provide two passages which are surrounded by conical seats that are controlled by conical valves 95, 96, both of which open downwardly (Fig. 7.) The stems 97, 98, respectively, of said valves extend through guide openings in the cover plate 80 and said valves are normally held upwardly against their seats by expansion springs 99, 100, respectively, in the manner generally indicated in respect of the stem of the valve 84. The valve 95 is equipped with a guide cylinder 101 which operates in a suitable cylinder formed in the abutment block.

Between said valves 95, 96 the abutment block is formed to provide a raised valve opening having a conical seat that is controlled by a conical valve 102. This valve is a downwardly closing valve and is pressed against the seat by an expansion spring 103 which surrounds the stem 104 of the valve and is interposed between the cover plate or wall and a shoulder in a cylindric guide 105 that operates in a suitably shaped cylinder of the cast abutment block. The space in said cylinder communicates with the firing chamber through a port 106.

The valve opening or thoroughfare which is controlled by the valve 96 communicates with an intake passage 107 adapted to be connected with a suitable pipe 108 to a source of gaseous mixture. When said valve 96 is open the gaseous mixture may flow directly to the space in rear of the abutment block through the passage 82, the gaseous mixture being subsequently compressed between the abutment block and the piston during the time when the piston is moving from the position shown in Fig. 9 to that illustrated in Fig. 10.

The valve 95 is opened at or about the time when the general engine parts assume the position indicated in said Fig. 10, or when the gaseous mixture, previously admitted to the cylinder is compressed. At this time also the valve 102 is raised off its seat, so that the compressed gaseous mixture which enters from the cylinder space through the passageway 82 and the thoroughfare controlled by the valve 95 may enter the combustion chamber through the thoroughfare controlled by the valve 102 and the port 106 which leads from the cylinder that incloses the guide piston associated with the valve 102. The valve 102 is raised above the plane of the valves 95, 96 so as to afford this communication. Inasmuch as the valve 102 seats downwardly, the pressure caused by the firing of the gaseous mixture in the chamber 75 does not leak backwardly past the valve.

The valves are severally controlled at the times herein indicated by a series of concentric cam rings or ribs 112, 113, 114, 115, 116, that are formed on or carried by the cam disk 61 before referred to. Conveniently, and as herein shown, three of the cam ribs 112, 113, 114 are formed on one side of the disk 61 and the other two cam ribs 115, 116 are formed on the other side of said disk. Said cams, through the medium of pivoted cam operated levers 117, 118, 119, 120, 121, that are connected respectively to the valves 95, 96, 102 on the one side, and the valves 84, 85 on the other side of the abutment block operate the several valves in the timed relation herein mentioned. Said cam levers are provided with bearing rollers that ride on the cam ribs.

Figures 3, 8:
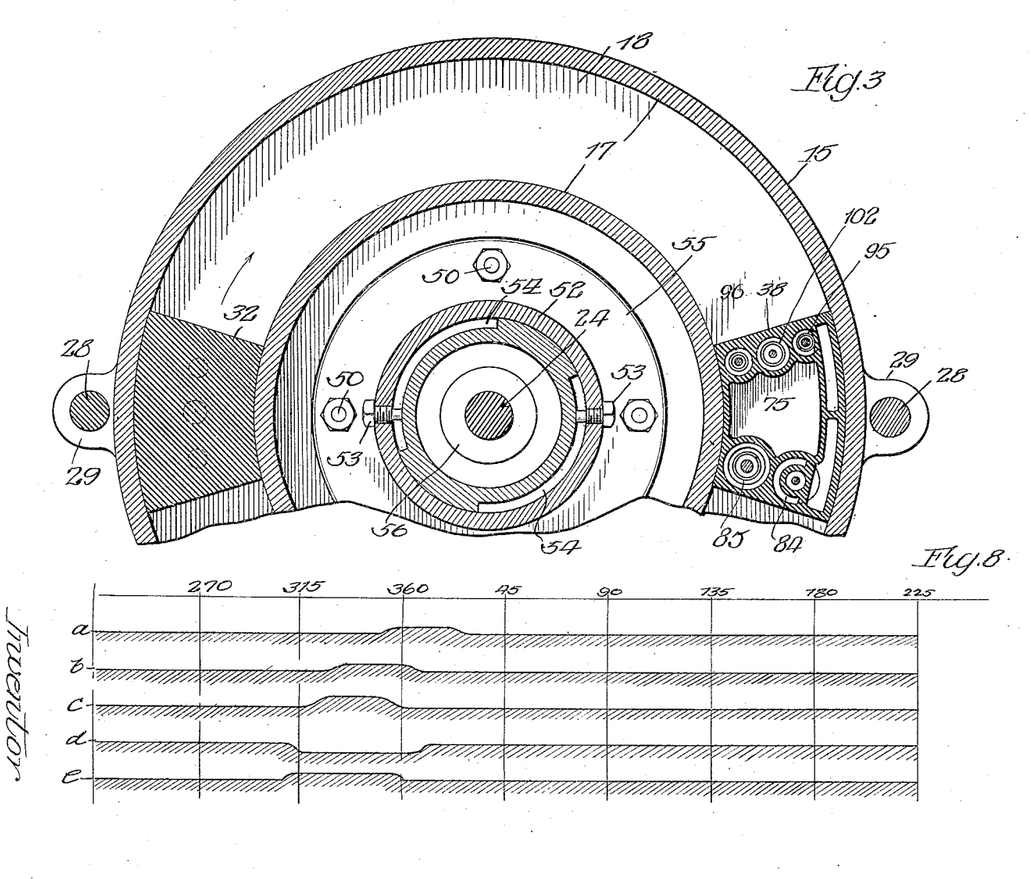
Fig. 3 is a partial vertical section on the line 3—3 of Fig. 2.
Fig. 8 is a diagram showing in a flat plane the cams for controlling the valves.

The relation of the cam ribs to effect the proper actuation of the valve is indicated in Fig. 8, wherein it is noted that the cam rib or track $a$ is the one which actuates the valve 96; the cam rib or track $b$ is the one which actuates the valve 102; the cam rib or track $c$ is the one which actuates the valve 95; the cam rib or track $d$ is the one which actuates the valve 85, and the cam rib or track $e$ is the one which actuates the valve 84.

Figure 12:
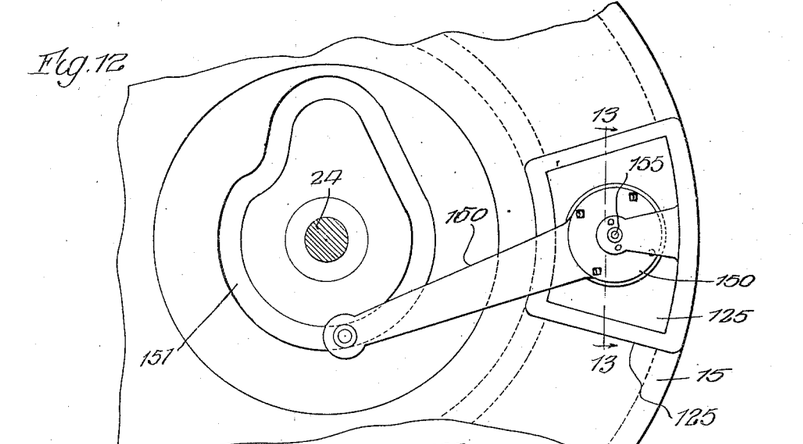
Fig. 12 is a fragmentary end view of the engine showing a modified valve gear or control.
Figure 13:
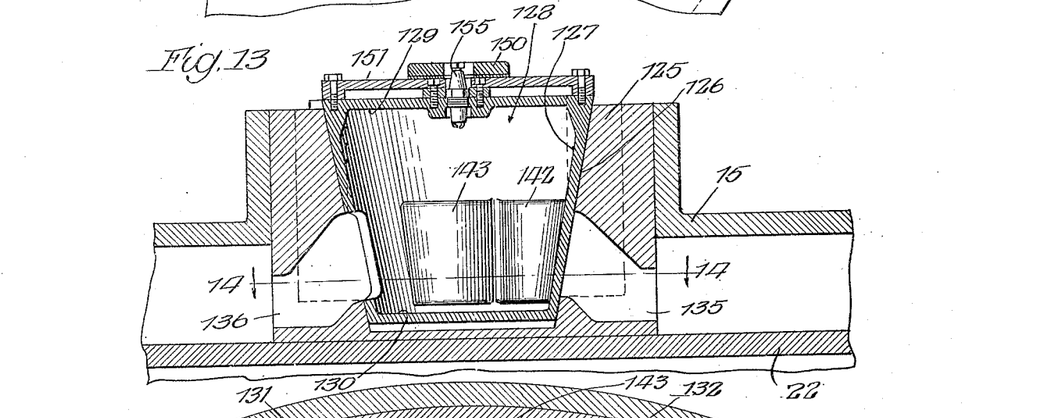
Fig. 13 is a section on the line 13, 13 of Fig. 12.
Figure 14:
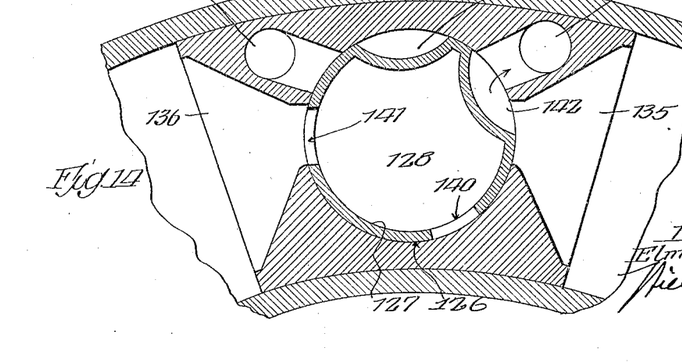
Fig. 14 is a section on the line 14, 14 of Fig. 13.

In Figs. 12, 13, and 14 is shown a modified form of valve and controlling means for admitting mixture to and discharging spent gases from the cylinder. As shown in said figures, 125 designates the abutment block, preferably made of cast metal. It is formed with an outwardly flaring tapered seat 126, within which fits a tapered casing or shell 127 in which is formed the combustion or expansion chamber 128, which is closed at its ends by end walls 129, 130 that may be integral with the block. The casting is formed also with inlet and exhaust passages 131, 132, respectively, having lateral branches that open into the tapered seat of the casting to receive the casing 127. The abutment block casting is formed at one side with a tapered opening 135 that communicates with the cylinder space in front of the abutment block; and is formed at its other side with a like tapered opening 136 that communicates with the cylinder space in rear of said abutment block. The tapered casing or shell 127 is provided in its walls with through ports 140, 141, which are adapted, by rotation of said shell, to respectively register with the ports 135 and 136 of the abutment casting. Said shell or casing 127 is provided with two external by-passes 142, 143 adapted to respectively connect the port 135 with the exhaust passage 132 and the port 136 with the inlet port 131, as will be apparent from an inspection of Fig. 14.

The said shell or casing 127 is rocked on its axis by means of a lever 150 that is axially fixed thereto through the medium of a plate 151 fixed to the larger end of said shell, and a cam groove 151 that rotates about the shaft 24 and in which a roller of the lever arms travels. The base of the cam lever is perforated to receive the spark plug 155 which extends into the explosion chamber 128.

By reference to Fig. 14 of the drawings, it will be observed that when the valve shell is in the position illustrated in said figure, the compressed mixture is free to pass from the cylinder into the combustion chamber 128. The valve occupies this position when the engine parts assume the position illustrated in Fig. 10. When the valve is turned from the position shown in Fig. 14 in an anti-clockwise direction to bring the external by-pass 143 in register with the inlet passage 131 and the passage 136, communication is established between the source of explosive mixture and the cylinder, and this movement of the valve takes place just after the stator has been separated from the rotor, so that the explosive mixture is drawn into the cylinder by the force of the vacuum created by the separation of the rotor and stator. While the explosive mixture is being thus directed to the cylinder in rear of the abutment block, the port 140 has been moved in register with the passage 135 so that the flame of explosion may be directed to the power face of the piston which at this time occupies the position shown in Fig. 9. It will also be observed that the valve casing, when in the position shown in said Fig. 14, through its external by-pass 142, brings the passage 135 into register with the exhaust passage 132, so that the spent gases are free to exhaust from the cylinder.

I claim as my invention:

1. A rotary engine comprising a rotor and a stator, one of which is formed to provide an annular cylinder space to receive a portion of the other, a piston carried by the rotor and extending across said cylinder space and movable axially in the rotor, an abutment also extending across said cylinder space relatively to which and the rotor the stator are axially movable, with means to give movement to the axially movable part, and inlet and exhaust valve mechanisms.

2. A rotary engine comprising two main elements, a rotor and a stator, one of which is movable axially toward and from the other, there being a cylinder formed in one of said parts, with an abutment extending thereacross and a piston carried by the other part and operating in the cylinder, a shaft driven by the rotor, inlet and exhaust valve mechanisms to control the admission of a motive agent to and its exhaust from the cylinder, and means operative at periodic intervals to force the movable element toward the other element.

3. A rotary engine comprising two main elements, a rotor and a stator, one of which is movable axially toward and from the other and circumferentially relatively to its axis, there being a cylinder formed in one of said parts, with an abutment extending thereacross and a piston carried by the other part and operating in the cylinder, a shaft driven by the rotor, inlet and exhaust valve mechanisms to control the admission of a motive agent to and its exhaust from the cylinder, and means operative at periodic intervals to force the movable element toward the other element.

4. A rotary engine comprising a stator having an annular cylinder space, a rotor formed with a rim entering said space, a piston movable in said rotor and adapted to extend across the cylinder space and to be displaced endwise therefrom, an abutment in the stator also extending across the cylinder, inlet and exhaust valve mechanisms controlling the admission of a motive agent to and its exhaust from the cylinder, and means to move said stator axially relatively to said abutment and toward and from the rotor for the purpose of driving out the spent motive agent from the cylinder and to permit said piston to pass said abutment.

5. A rotary engine comprising two main elements, a rotor and a stator, one of which is movable toward and from the other, there being a cylinder formed in one of said parts, with an abutment extending thereacross and a piston carried by the other part and operating in the cylinder, a shaft driven by the rotor, inlet and exhaust valves to control the admission of a motive agent to and its exhaust from the cylinder, and means operating at periodic intervals to force the movable element toward the other element, with means to vary the total movement of the movable element toward the other to thereby vary the cylinder area and thereby the horse power of the engine.

6. A rotary engine comprising two main elements, a rotor and a stator, one of which is movable toward and from the other, there being a cylinder formed in one of said parts, with an abutment extending thereacross and a piston carried by the other part and operating in the cylinder, a shaft driven by the rotor, inlet and exhaust valves to control the admission of a motive agent to and its exhaust from the cylinder, and means operating at periodic intervals to force the movable element toward the other element, with means operative during the operation of the engine to vary the horse power of the engine.

7. A rotary engine comprising a stator having an annular cylinder space, a rotor formed with a rim entering said space, a piston movable in said rotor and adapted to extend across the cylinder space and to be displaced endwise, an abutment in the stator and extending across the cylinder, said stator being axially movable relatively to said abutment toward and from the rotor, with means to effect such axial movement, there being a combustion chamber in said abutment, and valve controlled ports affording communication between said chamber and the cylinder space at both sides of said abutment.

8. A rotary engine comprising a stator having an annular cylinder space, a rotor formed with a rim entering said space, a piston movable in said rotor and adapted to extend across the cylinder space and to be displaced endwise therefrom, an abutment in the stator extending across the cylinder space, said stator being axially movable relatively to said abutment and toward and from the rotor, with means to effect such axial movement, there being a combustion chamber in said abutment, and valve controlled ports affording communication between said chamber and the cylinder space at both sides of said abutment.

9. A rotary engine comprising an axially fixed rotor, a shaft connected to and driven thereby, a stator movable axially toward and from the rotor and provided with an annular cylinder space, the stator provided with an annular flange to enter said space and provided with a notch, a piston movable in said notch and spring held against the stator across the cylinder space, an abutment carried by said stator and held against the rotor across said cylinder space, a cam fixed to said rotor to move the stator toward the rotor, a spring tending to move the stator from the rotor and valve means to control the admission of a motive fluid to and its exhaust from the cylinder space.

10. A rotary engine comprising an axially fixed rotor, a shaft connected to and driven thereby, a stator movable axially toward and from the rotor and provided with an annular cylinder space, the stator provided with an annular flange to enter said space and provided with a notch, a piston movable in said notch and spring held against the stator across the cylinder space, an abutment carried by said stator and held against the rotor across said cylinder space, a cam to move the stator toward the rotor, a spring tending to move the stator from the rotor, means to adjust said cam to vary the movement of the stator from the rotor and to thereby vary the capacity of the cylinder space, and valve means to control the admission of a motive fluid to and its exhaust from the cylinder space.

11. A rotary engine comprising an axially fixed rotor, a shaft connected to and driven thereby, a stator movable axially toward the rotor and provided with an annular cylinder space, the rotor provided with an annular flange to enter said space and provided with a notch, a piston movable in said notch and spring held against the stator across the cylinder space, an abutment carried by said stator and held against the rotor across said cylinder space, a cam fixed to said shaft to move the stator toward the rotor, a spring tending to move the stator from the rotor, means to adjust said cam to vary the movement of the stator from the rotor and to thereby vary the capacity of the cylinder space, with means to adjust said cam during the operation of the engine, and valve means to control the admission of a motive fluid to and the exhaust from the cylinder space.

In witness whereof I claim the foregoing as my invention, I hereunto append my signature in the presence of two witnesses at Chicago, Illinois, this 4th day of June, 1918.

ELMER LUEBECK.

Witnesses:
W. L. HALL,
MARGARET D. ROBB.